United States Patent
Lu

(10) Patent No.: US 10,413,064 B1
(45) Date of Patent: Sep. 17, 2019

(54) ELECTRIC DRAWER WITH GESTURE SENSING

(71) Applicant: Dong Guan Song Wei Electric Technology Co., Ltd., Dongguan, Guangdong (CN)

(72) Inventor: Weilin Lu, Dongguan (CN)

(73) Assignee: DONG GUAN SONG WEI ELECTRIC TECHNOLOGY CO., LTD., Dongguan, Guangdong (CN)

( * ) Notice: Subject to any disclaimer, the term of this patent is extended or adjusted under 35 U.S.C. 154(b) by 0 days.

(21) Appl. No.: 16/141,988

(22) Filed: Sep. 26, 2018

(51) Int. Cl.
| | |
|---|---|
| A47B 88/457 | (2017.01) |
| A47B 88/477 | (2017.01) |
| G05B 15/02 | (2006.01) |
| F16H 19/04 | (2006.01) |

(52) U.S. Cl.
CPC .......... *A47B 88/457* (2017.01); *A47B 88/477* (2017.01); *F16H 19/04* (2013.01); *G05B 15/02* (2013.01); *F16H 2019/046* (2013.01)

(58) Field of Classification Search
CPC . F16H 19/04; F16H 2019/046; A47B 88/457; A47B 88/477
See application file for complete search history.

(56) References Cited

U.S. PATENT DOCUMENTS

| | | | | |
|---|---|---|---|---|
| 2001/0013745 A1* | 8/2001 | Fulterer | ............ | H03K 17/968 312/319.5 |
| 2003/0122459 A1* | 7/2003 | Huber | ............ | A47B 88/457 312/319.6 |
| 2003/0122519 A1* | 7/2003 | Huber | ............ | A47B 88/457 318/646 |
| 2008/0191591 A1* | 8/2008 | Blucher | ............ | A47B 88/457 312/319.1 |
| 2009/0248207 A1* | 10/2009 | Yoo | ............ | F25D 25/025 700/275 |
| 2009/0322470 A1* | 12/2009 | Yoo | ............ | A47B 88/457 340/3.1 |
| 2011/0156560 A1* | 6/2011 | Michael | ............ | E05B 47/00 312/310 |
| 2012/0089248 A1* | 4/2012 | Biba | ............ | G07F 11/18 700/213 |
| 2013/0038189 A1* | 2/2013 | Hauer | ............ | A47B 88/457 312/319.5 |
| 2013/0154461 A1* | 6/2013 | Bohle | ............ | A47B 88/457 312/319.6 |
| 2013/0340342 A1* | 12/2013 | Ahlfeld | ............ | A47B 88/457 49/31 |
| 2015/0250312 A1* | 9/2015 | Barrett | ............ | E05B 47/00 312/319.1 |

\* cited by examiner

*Primary Examiner* — Hanh V Tran
(74) *Attorney, Agent, or Firm* — Leong C. Lei

(57) ABSTRACT

An electric drawer with gesture sensing includes a cabinet body, a controller, a drawer body, a driving device, and a gesture sensor. The gesture sensor is used for sensing a gesture to open or close the drawer body and for transmitting the corresponding information to the controller. After that, the controller controls the operation of the driving device to open or close the drawer. Through this electric drawer, there is no need for the user to manually push and pull the drawer, and the user can open or close the drawer with a gesture to facilitate the use of the drawer.

4 Claims, 2 Drawing Sheets

ELECTRIC DRAWER WITH GESTURE SENSING

BACKGROUND OF THE INVENTION

1. Field of the Invention

The present invention relates to a drawer, and more particularly to an electric drawer with gesture sensing.

2. Description of the Prior Art

Drawers can be seen everywhere in our daily life. People often use drawers to store their own items, especially some daily necessities. Therefore, the frequency of use of drawers can be said to be very high, and the drawers are used almost every day. The common drawers are manual push-pull drawers, that is, when the drawer is opened, the drawer needs to be manually pulled out from the cabinet, and when the drawer is closed, the drawer is manually pushed into the cabinet. Such an opening and closing manner is not intelligent, causing great inconvenience to the user. Besides, due to the manual push and pull, it is easy to damage the drawer when an improper force is applied to the drawer.

Accordingly, the inventor of the present invention has devoted himself based on his many years of practical experiences to solve these problems.

SUMMARY OF THE INVENTION

In view of the drawbacks of the prior art, the primary object of the present invention is to provide an electric drawer with gesture sensing, which can solve the problem that the conventional drawer is used inconveniently.

In order to achieve the above object, the present invention adopts the following technical solutions.

An electric drawer with gesture sensing comprises a cabinet body, a controller, a drawer body, a driving device, and a gesture sensor. The cabinet body has an accommodating chamber with an opening facing forward. The controller is disposed on the cabinet body. The drawer body is movably disposed in the accommodating chamber. The driving device is disposed in the cabinet body. The driving device is connected with the controller for driving the drawer body to move inwardly and outwardly. The gesture sensor is disposed on the cabinet body and exposed out of the cabinet body. The gesture sensor is connected with the controller.

Preferably, two inner side walls of the accommodating chamber are provided with rails extending laterally. Two sides of the drawer body are provided with slide rails. The slide rails are slidably connected to the rails and movable along the rails.

Preferably, bottom portions of front and rear ends of the slide rails are formed with positioning recesses, respectively. The cabinet body is provided with a stopper therein. The stopper is connected with the controller. The stopper is located in the opening of the accommodating chamber. The stopper is mated and engaged with one of the positioning recesses. The stopper is configured to limit the position of inward and outward movement of the drawer body.

Preferably, the driving device includes a motor, a gear, and a rack. The motor is mounted close to an inner side of the opening of the accommodating chamber through a fixing plate. The gear is mounted on an output shaft of the motor. The motor drives the gear to rotate back and forth. The rack is fixed to a side of the drawer body and extends laterally. The rack is meshed with the gear.

Preferably, the motor is provided with a position sensor. The position sensor is connected with the controller.

Preferably, the gesture sensor is exposed out of a front side of a top end of the cabinet body.

The present invention has obvious advantages and beneficial effects compared with the prior art. Specifically, it can be known from the above technical solutions:

The gesture sensor is used for sensing a gesture to open or close the drawer body and for transmitting the corresponding information to the controller. After that, the controller controls the operation of the driving device to open or close the drawer. Through this electric drawer, there is no need for the user to manually push and pull the drawer, and the user can open or close the drawer with a gesture to facilitate the use of the drawer.

Embodiments of the present invention will now be described, by way of example only, with reference to the accompanying drawings.

DETAILED DESCRIPTION OF THE PREFERRED EMBODIMENTS

Figure 1:
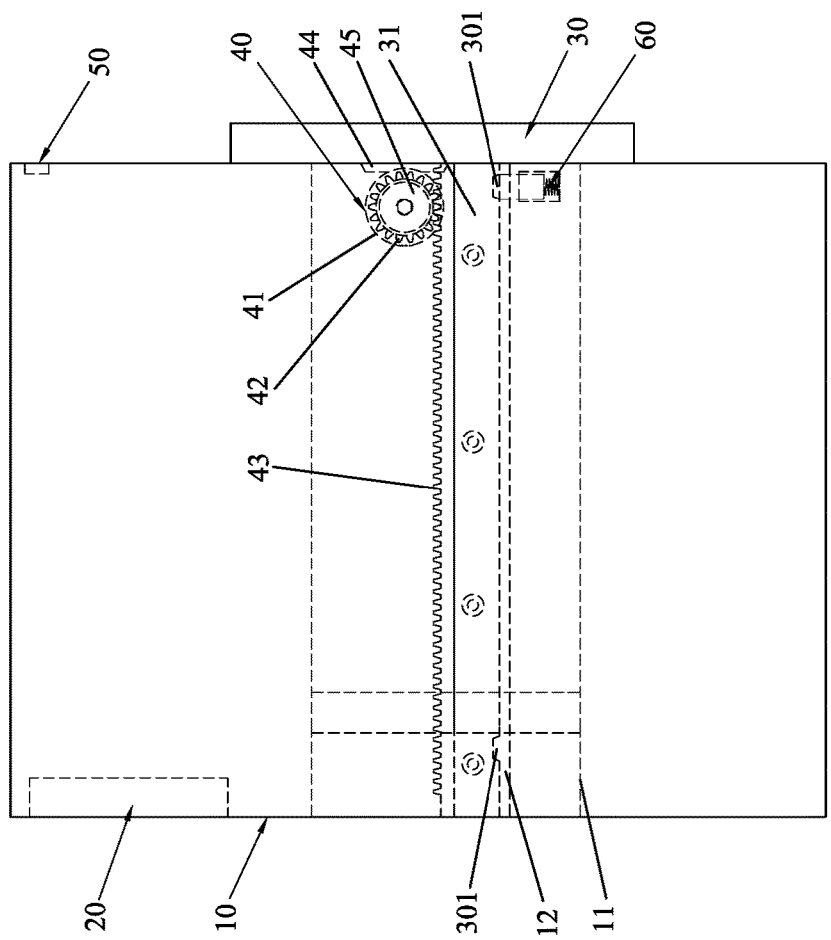
FIG. 1 is a schematic view of the drawer body in a closed state according to a preferred embodiment of the present invention.
Figure 2:
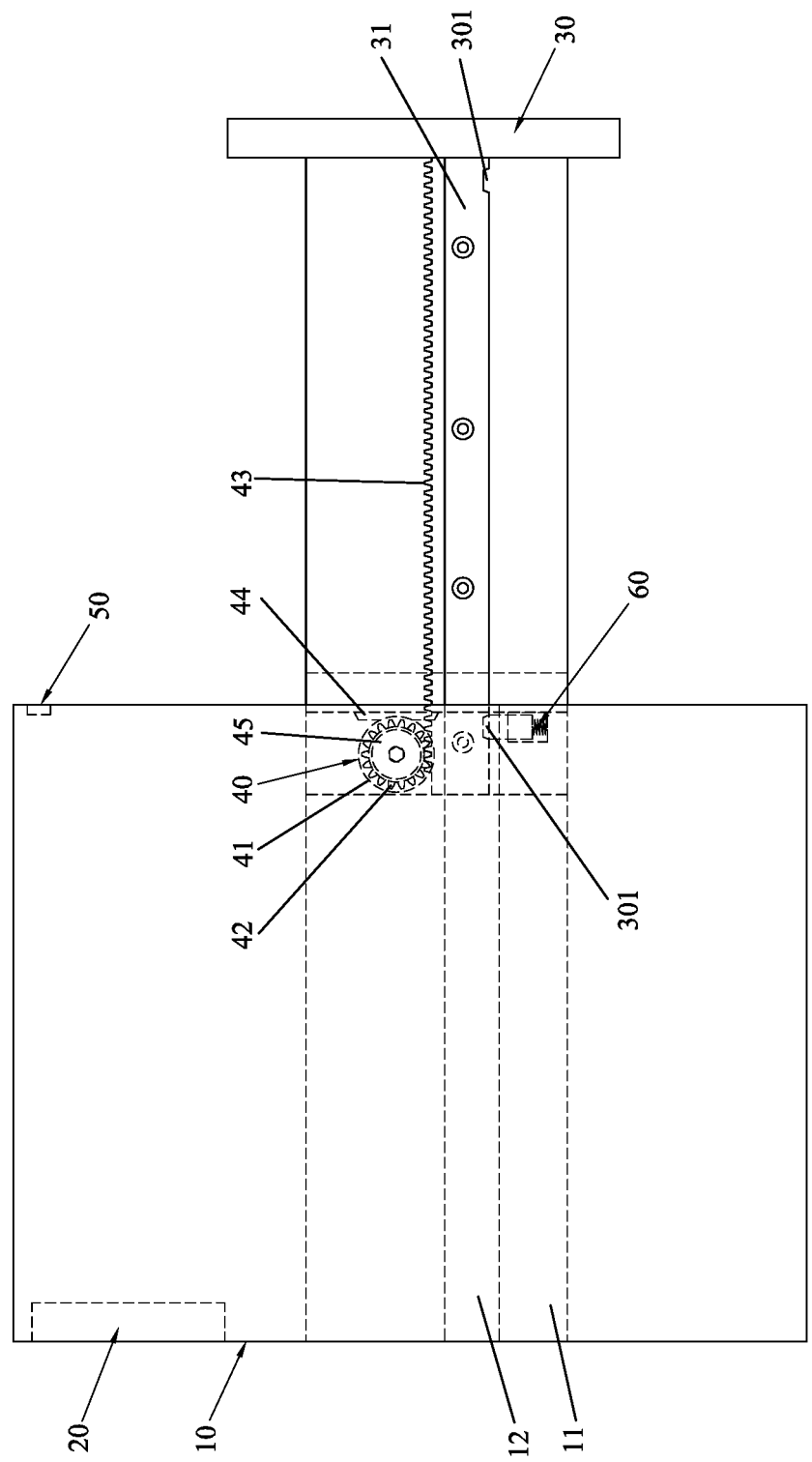
FIG. 2 is a schematic view of the drawer body in an open state according to the preferred embodiment of the present invention.

Referring to FIG. 1 to FIG. 2, a specific structure in accordance with a preferred embodiment of the present invention comprises a cabinet body 10, a controller 20, a drawer body 30, a driving device 40, a gesture sensor 50, and a stopper 60.

The cabinet body 10 has an accommodating chamber 11 with an opening facing forward. Two inner side walls of the accommodating chamber 11 are provided with rails 12 extending laterally.

The controller 20 is disposed on the cabinet body 10, and the controller 20 is located on the rear side of the cabinet body 20.

The drawer body 30 is movably disposed in the accommodating chamber 11. Two sides of the drawer body 30 are provided with slide rails 31. The slide rails 31 are slidably connected to the rails 12 and movable along the rails 12. The bottom portions of the front and rear ends of the slide rails 31 are formed with positioning recesses 301, respectively.

The driving device 40 is disposed in the cabinet body 10. The driving device 40 is connected with the controller 20 for driving the drawer body 30 to move inwardly and outwardly. Specifically, the driving device 40 includes a motor 41, a gear 42, and a rack 43. The motor 41 is mounted close to the inner side of the opening of the accommodating chamber 11 through a fixing plate 44. The motor 41 is provided with a position sensor 45. The position sensor 45 is connected with the controller 20. The gear 42 is mounted on an output shaft of the motor 41. The motor 41 drives the gear 42 to rotate back and forth. The rack 43 is fixed to the side of the drawer body 30 and extends laterally. The rack 43 is meshed with the gear 42.

The gesture sensor 50 is disposed on the cabinet body 10 and exposed out of the cabinet body 10. The gesture sensor 50 is connected with the controller 20. In this embodiment, the gesture sensor 50 is exposed out of the front side of the top end of the cabinet body 10.

The stopper 60 is disposed in the cabinet body 10 and connected with the controller 20. The stopper 60 is configured to limit the position of the inward and outward movement of the drawer body 30. In this embodiment, the stopper 60 is located in the opening of the accommodating chamber 11. The stopper 60 is mated and engaged with one of the positioning recesses 301.

The working principle of this embodiment is described as follows:

First, the power is turned on. Initially, the drawer body 30 is in a closed state. As shown in FIG. 1, the stopper 60 is engaged in the front positioning recess 301 to restrict the movement of the drawer body 30.

When the gesture sensor 50 detects a gesture to open the drawer body 30, a signal is transmitted to the controller 20, and then the controller 20 issues an instruction to de-energize the stopper 60. When the stopper 60 is de-energized, the stopper 60 is disengaged from the front positioning recess 301, and the movement of the drawer body 30 is no longer restricted. Then, the driving device 40 is energized and drives the drawer body 30 to move outwardly, so that the drawer body 30 is opened outwardly. When the position sensor 45 detects that the drawer body 30 is opened to the predetermined position, the controller 20 issues an instruction to de-energize the driving device 40 and stop driving the drawer body 30, and the stopper 60 is energized and engaged in the rear positioning recess 301 to stop the drawer body 30. At this time, the drawer body 30 is in an open state as shown in FIG. 2.

When the gesture sensor 50 detects a gesture to close the drawer body 30, a signal is transmitted to the controller 20, and then the controller 20 issues an instruction to de-energize the stopper 60. When the stopper 60 is de-energized, the stopper 60 is disengaged from the rear positioning recess 301, and the movement of the drawer body 30 is no longer restricted. Then, the driving device 40 is energized and drives the drawer body 30 to move inwardly, so that the drawer body 30 is closed inwardly. When the position sensor 45 detects that the drawer body 30 is closed to the predetermined position, the controller 20 issues an instruction to de-energize the driving device 40 and stop driving the drawer body 30, and the stopper 60 is energized and engaged in the front positioning recess 301 to stop the drawer body 30. At this time, the drawer body 30 is in a closed state as shown in FIG. 1.

In addition, when the power is off in this embodiment, the stopper 60 is de-energized and cannot be engaged in the positioning recess 301, so that the user can manually open or close the drawer body 30.

The feature of the present invention is described below.

The gesture sensor is used for sensing a gesture to open or close the drawer body 30 and for transmitting the corresponding information to the controller. After that, the controller controls the operation of the driving device to open or close the drawer. Through this electric drawer, there is no need for the user to manually push and pull the drawer, and the user can open or close the drawer with a gesture to facilitate the use of the drawer.

Although particular embodiments of the present invention have been described in detail for purposes of illustration, various modifications and enhancements may be made without departing from the spirit and scope of the present invention. Accordingly, the present invention is not to be limited except as by the appended claims

What is claimed is:

1. An electric drawer with gesture sensing, comprising a cabinet body, a controller, a drawer body, a driving device and a gesture sensor; the cabinet body having an accommodating chamber with an opening facing forward; the controller being disposed on the cabinet body; the drawer body being movably disposed in the accommodating chamber; the driving device being disposed in the cabinet body, the driving device being connected with the controller for driving the drawer body to move inwardly and outwardly; the gesture sensor being disposed on the cabinet body and exposed out of the cabinet body, the gesture sensor being connected with the controller;

wherein two inner side walls of the accommodating chamber are provided with rails extending laterally, two sides of the drawer body are provided with slide rails, and the slide rails are slidably connected to the rails and movable along the rails;

wherein bottom portions of front and rear ends of the slide rails are formed with positioning recesses respectively, the cabinet body is provided with a stopper therein, the stopper is connected with the controller, the stopper is located in the opening of the accommodating chamber, the stopper is mated and engaged with one of the positioning recesses, and the stopper is configured to limit the position of inward and outward movement of the drawer body; and wherein the stopper disengages from the positioning recesses in a de-energized condition to allow drawer body to be manually opened or closed in the de-energized condition.

2. The electric drawer with gesture sensing as claimed in claim 1, wherein the driving device includes a motor, a gear, and a rack; the motor is mounted close to an inner side of the opening of the accommodating chamber through a fixing plate; the gear is mounted on an output shaft of the motor, the motor drives the gear to rotate back and forth; the rack is fixed to a side of the drawer body and extends laterally, and the rack is meshed with the gear.

3. The electric drawer with gesture sensing as claimed in claim 2, wherein the motor is provided with a position sensor, and the position sensor is connected with the controller.

4. The electric drawer with gesture sensing as claimed in claim 1, wherein the gesture sensor is exposed out of a front side of a top end of the cabinet body.

* * * * *